(12) United States Patent
Shpiro et al.

(10) Patent No.: US 7,203,840 B2
(45) Date of Patent: Apr. 10, 2007

(54) ACCESS CONTROL FOR INTERACTIVE LEARNING SYSTEM

(75) Inventors: Zeev Shpiro, Ra'anana (IL); Eric Cohen, Ra'anana (IL)

(73) Assignee: Burlingtonspeech Limited, Limassol (CY)

( * ) Notice: Subject to any disclaimer, the term of this patent is extended or adjusted under 35 U.S.C. 154(b) by 876 days.

(21) Appl. No.: 10/023,923

(22) Filed: Dec. 18, 2001

(65) Prior Publication Data
US 2002/0087893 A1   Jul. 4, 2002

Related U.S. Application Data

(60) Provisional application No. 60/256,558, filed on Dec. 18, 2000.

(51) Int. Cl.
*H04L 9/00* (2006.01)
(52) U.S. Cl. .................. 713/186; 713/168; 713/170
(58) Field of Classification Search ........... 713/170, 713/153, 186
See application file for complete search history.

(56) References Cited

U.S. PATENT DOCUMENTS

| | | | |
|---|---|---|---|
| 5,229,764 A | 7/1993 | Matchett et al. | 340/5.52 |
| 5,309,359 A * | 5/1994 | Katz et al. | 707/102 |
| 5,487,671 A | 1/1996 | Shpiro et al. | 434/185 |
| 5,766,015 A | 6/1998 | Shpiro | 434/156 |
| 5,947,747 A | 9/1999 | Walker et al. | 434/354 |
| 5,963,908 A | 10/1999 | Chadha | 704/273 |
| 6,029,043 A | 2/2000 | Ho et al. | 434/350 |
| 6,134,529 A | 10/2000 | Rothenberg | 704/270 |
| 6,296,489 B1 * | 10/2001 | Blass et al. | 434/185 |
| 6,356,437 B1 * | 3/2002 | Mitchell et al. | 361/683 |
| 6,438,515 B1 * | 8/2002 | Crawford et al. | 704/5 |
| 2002/0004785 A1 * | 1/2002 | Schull | 705/51 |

FOREIGN PATENT DOCUMENTS

WO    WO 98/44483    10/1998

OTHER PUBLICATIONS

Konig, L. Heck, M. Weintraub, & K. Sonmez, (1998), "Nonlinear Discriminant Feature Extraction for Robust Text-Independent Speaker Recognition," *Proc. RLA2C-ESCA Speaker Recognition and its Commercial and Forensic Applications*, pp. 72-75, Avignon, France.

* cited by examiner

*Primary Examiner*—Kambiz Zand
(74) *Attorney, Agent, or Firm*—Townsend and Townsend and Crew

(57) ABSTRACT

A technique to control access to computer network resources at a computer facility permits a user to interact with the computer facility through a computer node of a network, wherein the user interaction comprises language learning responses submitted to the computer facility through the computer node, and a user authentication process is performed to determine if the permitted user interaction is authorized. The user authentication process is performed with user authentication information that is obtained by the computer facility during the permitted user interaction and also with user authentication information that is extracted from the user's language learning responses. In this way, user authentication occurs without intruding into the utilization of the computer facility.

18 Claims, 11 Drawing Sheets

ACCESS CONTROL FOR INTERACTIVE LEARNING SYSTEM

REFERENCE TO PRIORITY DOCUMENT

This application claims priority of co-pending U.S. Provisional Patent Application Ser. No. 60/256,558 entitled "Access Control for Interactive Learning System" by Z. Shpiro et al., filed Dec. 18, 2000. Priority of the filing date of Dec. 18, 2000 is hereby claimed, and the disclosure of the Provisional Patent Application is hereby incorporated by reference.

BACKGROUND OF THE INVENTION

1. Field of the Invention

This invention relates generally to access control for computer network resources and, more particularly, to controlling access to a network location that provides interactive learning processing.

2. Description of the Related Art.

As commerce becomes more global, the need for understanding second languages and being able to communicate in them is growing. The Foreign Language/Second Language training industry therefore is a rapidly expanding industry, and is now investigating how to apply new technologies, such as the Internet, to such training. Current language training product elements include printed materials, audio cassettes, software applications, video cassettes, and Internet sites through which information and distance learning lessons are provided. Several attempts have been made to apply various Foreign Language/Second Language training processes to the Internet world, but most of them are simple conversions of printed, audio, and video material into a computer client-server application; i.e. the Internet applications are typically not offering new features beyond the current features offered by conventional media.

The publishing industry involved with Foreign Language/Second Language training is vulnerable to lost revenue due to forgeries, lending, photocopying, and second-hand purchases of their printed training materials. A forgery occurs when someone makes an unauthorized copy of the original training materials, such as by illicit photocopying. The forgeries may be passed off as genuine, authorized materials. When a forgery is sold, the publisher receives no compensation and all revenue from the forgery is collected by the seller of the forged copy. Lending losses occur because copies of original materials are loaned to third parties, who then need not purchase the source materials. Similarly, unauthorized photocopying of original materials results in reduced demand for the materials. Second-hand purchases deprive publishers of revenue because the second-hand seller receives the revenue from such sales. All of these uses of original materials are either unauthorized or currently beyond the control of the publishers, and all reduce the publisher's revenue. It would be advantageous if producers of language training materials could capture some of the lost income from such uses of their printed materials.

Modern computer technology can provide a network implementation of software applications to make on-line versions of the training materials available, thereby enabling access and approaching larger numbers of users. Computer technology can also be used to supplement and enhance the presentation of training materials. Network access to such training materials is conveniently implemented via the Internet. Because on-line access is so easily obtained, the easy access also means that the opportunity for unauthorized usage of the applications and materials in the new medium is greater. Speaker recognition technology is a potentially powerful means of increasing the efficiency, quality, and enjoyment of language instruction through on-line access. There are many applications, in different areas (such as credit card transaction authorizations, security access, password protection for access to computerized systems, etc.), where speaker recognition technology is being applied as a security measure to ensure proper identification of a user.

A variety of speaker recognition products are currently offered by companies such as SpeechWorks International, Inc. of Boston, Mass., USA and Dialogic Corporation of Parsippany, N.J., USA, and the like. Speaker recognition technology also is currently being offered by companies such as ITT SpeakerKey, NetKey and WEBKey, Lucent Speaker Verification, and "SpeakEZ" from T-Netix, Inc. of Englewood, Colo., USA. An example of a commercial application is the integration of speaker verification into the "Mac OS 9" operating system by Apple Computer, Inc. of Cupertino, Calif., USA for voice verification of user access to the computer operating system. In such systems, access is denied until a speaker recognition process is completed.

The phenomena of photocopying, second-hand purchase, lending, and forgery is a significant problem for the publishing industry. The publishing industry suffers significant losses of potential income due to the significant rise in second-hand sales of previously used materials, and due to purchases of books and the lending and photocopying of books, primarily in the educational sector. There are jurisdictions which advocate the enactment of lending and photocopying laws. Many of these laws might benefit the consumer, but will be highly detrimental to the publisher, because they will result in a decrease of purchases of original materials from the publisher. In addition, the forgery phenomenon prevalent in the designer clothing industry has infiltrated the publishing industry as well, resulting in serious profit losses to the publisher.

Internet-based distance learning techniques are being used, where an instructional provider maintains an Internet location such as a Web site and users visit the teaching Web site to receive both instruction and assessment of skills. As noted above, however, the opportunity for fraudulent use of such learning sites is great. For example, an authorized user may gain access to the Web site for a computer learning session, but then may leave the computer and a different student may continue, taking the place of the authorized student. This is undesirable for at least two reasons: first, the performance that is viewed by the service provider is not the performance of the actual student to whom it is attributed; and secondly, at least two persons are utilizing the learning site, although only one is providing payment or being charged, resulting in revenue loss for the Web site provider.

From the discussion above, it should be apparent that there is a need for a publishing product that incorporates both printed and Internet materials and that can be used only by authorized persons. Such access control would permit the publisher to benefit from licensing fees and thus earn income from users who acquired their products from sources other than the publisher. The present invention fulfills this need.

SUMMARY OF THE INVENTION

The present invention provides a technique to control access to computer network resources at a computer facility by permitting a user to interact with the computer facility through a computer node of a network, wherein the user interaction comprises language learning responses submitted to the computer facility through the computer node, and by performing a user authentication process to determine if the permitted user interaction is authorized and determining whether the permitted user interaction should be continued, if the user is determined not to be authorized, wherein the user authentication process is performed with user authentication information that is obtained by the computer facility during the permitted user interaction and also with user authentication information extracted from the user's language learning responses. In this way, user authentication occurs without intruding into the utilization of the computer facility.

The user authentication can occur as a result of speaker recognition processes that utilize speech information collected from the user who currently has access to the computer facility. The access control is especially suited to language training systems that collect speech information from users as part of their normal operation. In this way, the invention permits publishers of materials to incorporate both printed and Internet materials at a computer facility with confidence that the computer facility will be usable only by authorized persons.

In another aspect of the invention, a user who is determined by the system to be an unauthorized user will be invited to become an authorized user, such as by paying an additional registration fee. In this way, users are unaware of any explicit user identification checking operations being carried out, and once unauthorized users are discovered, they are invited to become authorized users and continue with their learning process in exchange for paying a fee. Thus, unauthorized persons are not immediately halted from using the system, but instead are treated as an opportunity for additional selling.

In yet another aspect of the invention, an input device such as a microphone apparatus can be offered for purchase wherein the microphone apparatus includes a code generator that produces a code output and communicates with the user computer over a channel via which the microphone apparatus provides an electrical signal to the user computer. In another aspect of the invention, the microphone apparatus is used by the user such that the user authentication information comprises a user code that is generated by the code generator of the microphone apparatus.

Other features and advantages of the present invention should be apparent from the following description of the preferred embodiment, which illustrates, by way of example, the principles of the invention.

DETAILED DESCRIPTION

Figure 1:
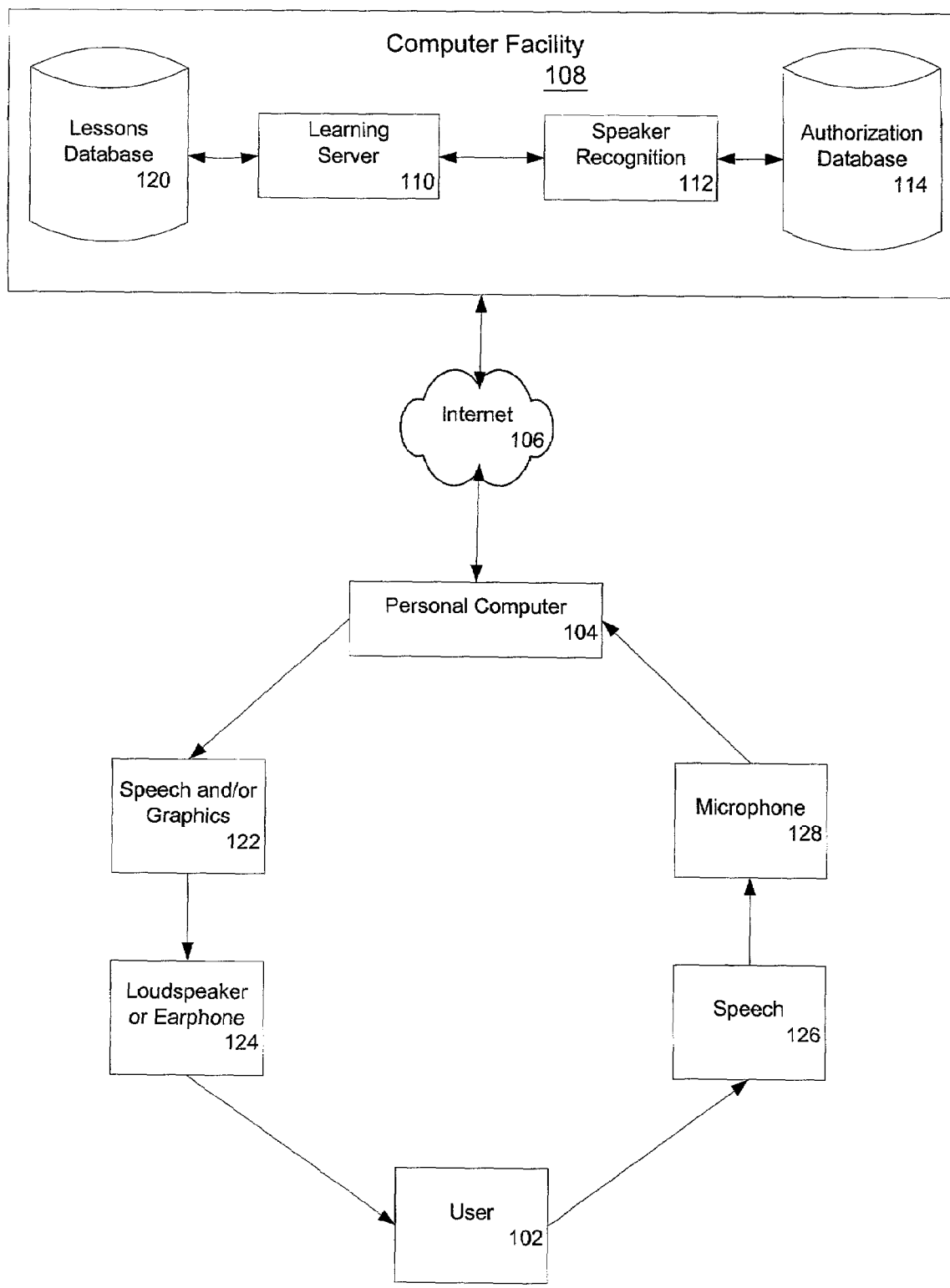
FIG. 1 is a block diagram of a network computer system constructed in accordance with the present invention.

FIG. 1 is a block diagram representation of a system 100 that provides network access control in accordance with the present invention. A user 102 at a Personal Computer 104 initiates a communication session over a computer network 106, such as the Internet, to gain access to an interactive network resource 108. The network resource 108 may comprise, for example, an interactive learning computer facility that is provided by a learning server 110 acting in concert with a speaker recognition processor 112. The learning server 110 receives a request for access from the user 102 and permits access to the computer network facility 108 by the user, who then makes use of the facility. While using the facility, the user will occasionally provide speech information by providing voice commands and responding to system queries. The computer facility 108 waits a predetermined time after access is initiated by the user, and then verifies that speech information of the user has been entered into a network Authorization Database 114 maintained at the computer facility 108.

If the user speech information data has not been previously entered, then the server computer 110 will receive voice data from the identified user 102 during the current communication session as a result of the user's speaking at the user client node 104. The server computer determines whether to permit continued access to the computer network facility 108 by the identified user in response to determining whether or not the user is an authorized user by using the speaker recognition techniques. The present invention thereby controls on-line access to a computer facility by granting access to a user and then unobtrusively performing user authentication with speaker recognition technology while the user is utilizing the computer facility.

In the embodiment illustrated in FIG. 1, the computer facility 108 provides language instruction. Other types of information and services may be provided by the facility, as desired. During the user's on-line interaction with the computer facility, the user will receive language lessons from the computer facility after retrieval from a Lessons Database 120. The received lessons may include a combination of audiovisual, text, and graphical information 122. The visual elements may be viewed on a display of the Personal Computer 104, and the audio elements will be listened to by the user over a speaker or earphone or headphone 124 of the Personal Computer 104. The Lessons Database 120 provides lessons, or data modules, from a program of language instruction. The data modules may be received on an interactive basis, such as provided by transfer of Web pages or through Internet streaming technology, or the data modules may be received by network download, such as through file transfer technology, for later viewing by the user.

The user 102 will respond to the received learning modules by producing speech 126 that will be received by a microphone apparatus 128 of the Personal Computer 104. In addition, the user may provide input to the computer facility 108 with keyboard and display mouse devices of the Personal Computer. During such computer interaction with the user, the computer 104 will convert the user's speech 126 into speech information, in a manner known to those skilled in the art, and will provide the learning facility 108 with that data. The speech information will then be compared by the Speaker Recognition processor 112 against speech information stored in the Authorization database 114. Such comparison techniques are known to those skilled in the art. The Speaker Recognition processor 112 and Learning Server 110 may comprise separate computers of the computer facility 108, or their functions may be combined into a single computer. The user speech information may also be referred to as speaker verification information or "voiceprint" information. Based on the speech information comparison, the learning server 110 will decide whether to permit continued access by the user. This processing is described in greater detail in FIG. 2.

User Authorization

Figure 2:
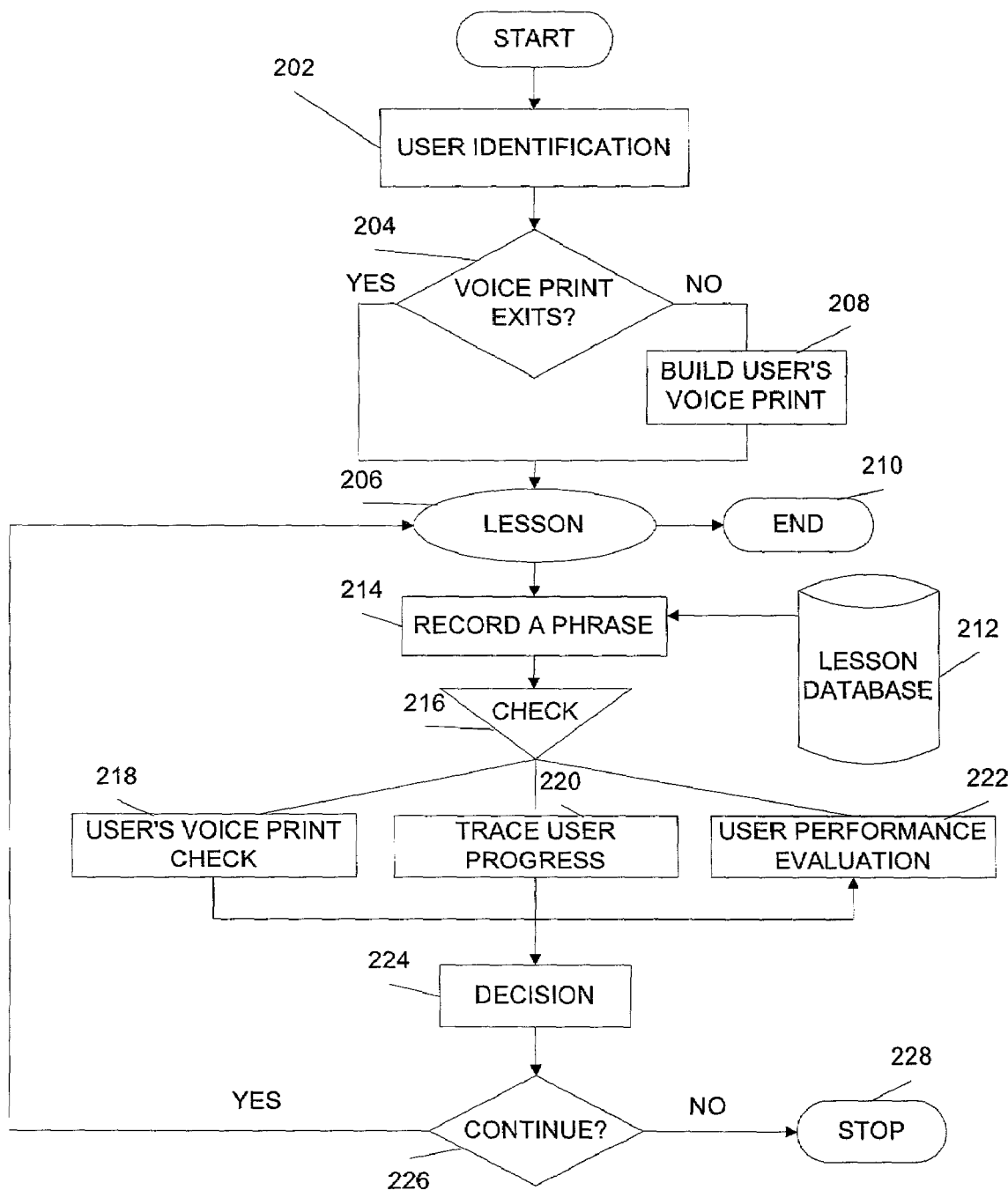
FIG. 2 is a flow diagram that illustrates the processing executed by the computers illustrated in FIG. 1 to provide access control in accordance with the invention.

FIG. 2 is a flow diagram that illustrates the processing executed by the system 100 illustrated in FIG. 1 to provide access control and confirm user authorization in accordance with the invention. Processing begins with a user invoking the system for user identification, as indicated by the flow diagram box numbered 202. In this operation, the user may be asked for his or her password or code and name. This initial self identification may be provided by keyboard input or by voice input. In the case of voice input, the user will respond by speaking into the computer microphone, thereby generating a voiceprint of the user, in a manner that will be well-known to those skilled in the art. Alternatively, the initial identification 202 may occur automatically, by sampling the user's voice or otherwise automatically obtaining user information.

In either case, the user identification 202 results in confirmation that a person who has provided identification parameters, such as name and password, has matching entries in the Authorization database for the provided name and password. The system then permits access to the computer facility by the user. If no match in the Authorization database is located, then the system prevents further access or provides the user with an opportunity to become an authorized user, such as by paying a fee. Thus, in the preferred embodiment, first-time users will be diverted to a registration process as part of the user identification 202.

When the user's speaker verification information is received, the system will check to determine if the user's voiceprint information already exists in the system. This is represented by the decision box numbered 204. If the voiceprint has already been received, an affirmative outcome at the decision box 204, then at box 206 a lesson or study module will be identified for delivery to the user. The system may, for example, provide the next sequential lesson in a lesson plan. If the voiceprint being checked has not previously been received, a negative outcome at the decision box 204, this indicates that a new user is attempting to gain access to the computer facility. The user voiceprint information is actually the means by which the system authorizes or verifies a user. Therefore, if the user is a new user, then at box 208 a voiceprint for the new user will be built and stored in the database. This process is described in greater detail below.

Once the system has confirmed that user voiceprint information is available, a lesson may be identified for delivery to the user at the flow diagram box numbered 206. Once the user has cycled through all lessons, the lesson sequence will end at box 210. Lessons will be retrieved from the Lessons database, as indicated at the flow diagram box numbered 212. During the normal course of interacting with the system to finish individual lessons, the user will be presented with one or more questions on a display of the user's computer. These questions also will be extracted from the Lesson database at the learning facility for presentation to the user, as indicated at box 212. The questions will require the user to answer verbally to record a phrase 214. The user's vocal response will also be recorded in the voiceprint Authorization database, creating a real-time voiceprint with corresponding voice parameters. This voiceprint information, collected during the normal course of interacting with the system to complete lessons, will be used by the system to decide whether or not to proceed with the lesson.

More particularly, the system will preferably permit normal lesson operation to occur and will periodically perform a check to determine if the user who is studying the lesson is the same individual person who was previously identified with the password and name obtained above (box 202). This prevents a situation such as where a person obtains the name and password of an authorized user and attempts to proceed with lesson studying posing as that other user. FIG. 2 shows that there are three ways of performing a check of user authorization, as depicted at the "Check" box 216. Each of these three checks provide an access parameter authorization outcome. The system may perform a voiceprint check of the user 218, the system may trace the studying user's progress against previous lesson progress 220, and the system may evaluate the studying user's performance 222. It should be noted that each of these three authorization checks 218, 220, 222 extracts information from the user's language responses without intrusion into the user interaction and without the user becoming aware of the authorization extraction process.

To perform the voiceprint check 218, the system uses voice recognition technology to compare the authorized user's recorded voiceprint information with that of the user who is studying the lesson. This is described in greater detail below. The comparison takes place in the background, without interfering with either the user or the lesson. To perform the trace of user progress 220, the system will follow the user's progress in the lesson plan to check for anomalies. An unexpected or unusual change in the current lesson's level (either up or down) by the studying user might be an indication that an authorized user has allowed someone else to enter the system. Once alerted to a potential problem in this way, the system will preferably determine whether the studying user is, in fact, the authorized user by rechecking the studying user's voiceprint information against the stored user voiceprint information. To perform the evaluation of the studying user's performance 222, the system will follow the user's performance in the lesson plan. Unexpected lower (or higher) performance results can be an indication that an authorized user has allowed access to an unauthorized user. After the system is alerted in this way to a potential problem, the system will preferably determine whether the user is, in fact, the authorized user by re-checking the user's voiceprint information.

After the requisite user authorization checks are performed, the system will come to a conclusion about whether the studying user is the same person as the previously authorized user associated with the user name and password first obtained at box 202. At box 224, the system will then make a decision about the user identification. That is, the system will decide whether or not the user is the properly licensed or authorized user. The system will then make a decision on continued access and continuation of the lesson, as indicated at the continuation box numbered 226. If the system has any doubts about the user's identity, a message will appear on the studying user's computer screen and preferably the current lesson will stop immediately at box 228. If the system decides that continuation is appropriate, then processing returns to the lesson presentation at box 206.

User Password Identification

Figure 3:
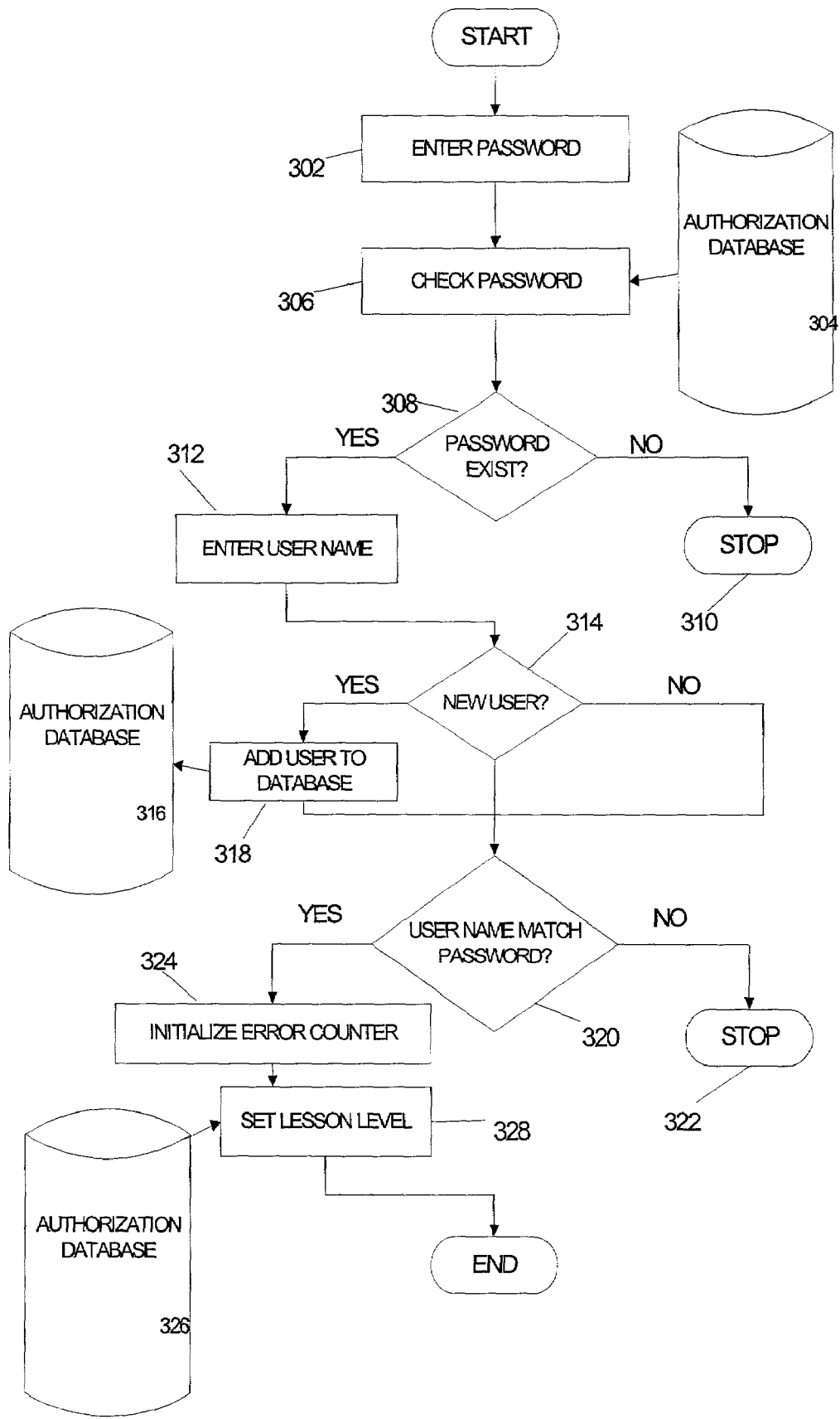
FIG. 3 is a flow diagram that illustrates the processing executed by the computers illustrated in FIG. 1 to perform the user identification processing shown in FIG. 2.

As noted above at box 202, user identification is performed when the user first attempts to use the system. FIG. 3 shows details of the initial user identification processing where the user name and password are checked. First, the user is asked to provide password information, which appears in the user copy of a lesson book produced by a language training publisher or may be provided with a microphone or with a limited access input device such as the microphone apparatus described further below. For example, the following message may appear on the user's computer screen: "Enter your password, please." At the FIG. 3 flow diagram box numbered 302, the user will enter the password, which for example can be found in the lesson book or attached to the microphone or input device. The system will then search for the password in the Authorization database at box 304 and check the password entered by the user against the database password at box 306. If the system determines that the password does not exist, a negative outcome at the decision box 308, then a warning message appears on the user's computer screen. For example, the following message may appear on screen: "You have supplied the wrong user password. Please contact us and we will be happy to assist you shortly." The system then immediately stops processing the lesson at box 310.

If the system determines that the password entered by the user does exist, the user will be asked to fill in his or her name. For example, the following message may appear on the user's computer screen: "Enter your name, please." The user will enter his or her name at box 312. The system will check the user name and determine whether the user is a new user, as indicated by the decision box 314. If the user's name is not found in the database, then the user is a new user, an affirmative outcome at the decision box 314, and at box 316 the user name will be added to the password Authorization database and at box 318 will be indicated as a new user. The Authorization database preferably includes information on the authorized users, such as Name, Password (for example from the accompanying lesson book), User skills parameters (Lesson level, Performance evaluation), and Voiceprint sample parameters. By using this information later, the system will prevent any other user from using the same password. At this stage (box 318), when the new user's name is first added to the Authorization database, all the user's skills parameters will be set to level zero.

Thus, the system has verified that the supplied password is a legitimate password (box 308) and has verified (or entered) the user name in the database (box 314). The system will next check to determine if the user name matches the password by searching for the user in the password database, as indicated by the decision box numbered 320. If the user is not the authorized user, a negative outcome at the decision box 320, then the system will prevent the user from continuing and will stop at box 322. For example, the following message will appear on the screen: "We are unable to identify you. Please contact us and we will be happy to assist you shortly." The system will then stop processing the lesson plan immediately.

If the user name matches the user password, an affirmative outcome at the decision box numbered 320, then the system initializes an error count at the flow diagram box numbered 324. The error count is an indication of a non-authorized user. After a predetermined number of identification failures, as represented by the error count, the system will identify the user as a non-authorized user and the entire process will stop. The system then retrieves the lesson level from the password Authorization database at 326 and sets the lesson level for the current user to this retrieved level, at box 328. This step ends the user identification processing.

Building the User Voiceprint

Figure 4:
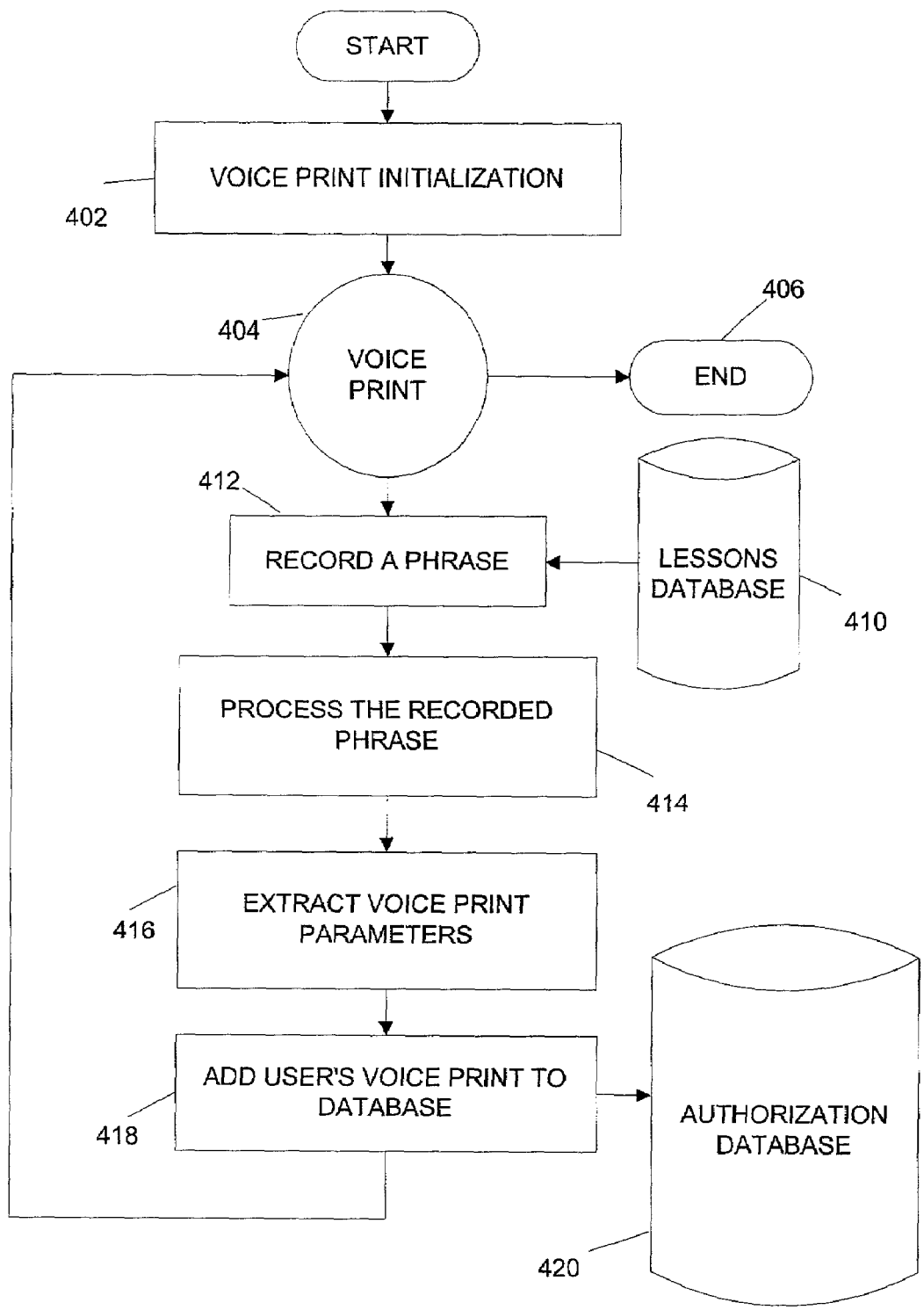
FIG. 4 is a flow diagram that illustrates the processing executed by the computers illustrated in FIG. 1 to perform the user voice print processing.

The process of building a voiceprint for a new user as a means of identifying the user is illustrated in FIG. 4. This process is performed if the system determines that no voiceprint information exists for an identified user who wants to access the learning facility. In the first step, represented by the FIG. 4 flow diagram box numbered 402, the system initializes voice print parameters. Those skilled in the art will understand that voice information, in digitized form, is represented by particular well-known parameters. Box 402 indicates that the system sets these parameters to zero or some other initial condition, ready to receive the parameters corresponding to the identified user.

In the next step, represented by the flow diagram box numbered 404, the system collects the voiceprint information. If the voiceprint information has been successfully stored, then the process ends at box 406. If the voiceprint information has yet to be successfully collected, meaning that it is not yet in the password database, then at box 404 the system collects the voiceprint information by having the user speak a phrase into the user's computer microphone. For example, the user may be asked to answer a question that appears on the display screen. The question is preferably chosen randomly from a Lessons Database, as indicated by the flow diagram box numbered 410. The user's spoken response, as represented by the microphone output signal, is digitized and recorded in the user's computer at the flow diagram box numbered 412. The recorded spoken response information is processed at box 414. This processing includes well-known processing techniques to represent the digitized information in a particular data format, such as what are referred to as Cepstral coefficients, and to provide an estimate of the spoken pitch. Such processing is described, for example, in the document "Nonlinear Discriminant Feature Extraction for Robust Text Independent Speaker Recognition" by Y. Konig, L. Heck, M. Weintraub and K. Sonmez (1998), Proceedings RLA2C-ESCA, Speaker Recognition and its Commercial and Forensic Applications, pp. 72–75, Avignon, France.

Next, as indicated by the flow diagram box numbered 416, the system extracts voiceprint parameters, thereby defining the speech information that will be used by the system for user identification. The extracted parameters permit the voiceprint information to be represented more compactly. This step is preferably performed by the user's computer, to minimize the amount of data that must be sent over the computer network to the learning facility. Finally, the extracted voiceprint information is provided to the learning facility, indicated at box 418, and the learning server stores the voiceprint information into the Authorization database, indicated at box 420.

Checking the Speech Information

Figure 5:
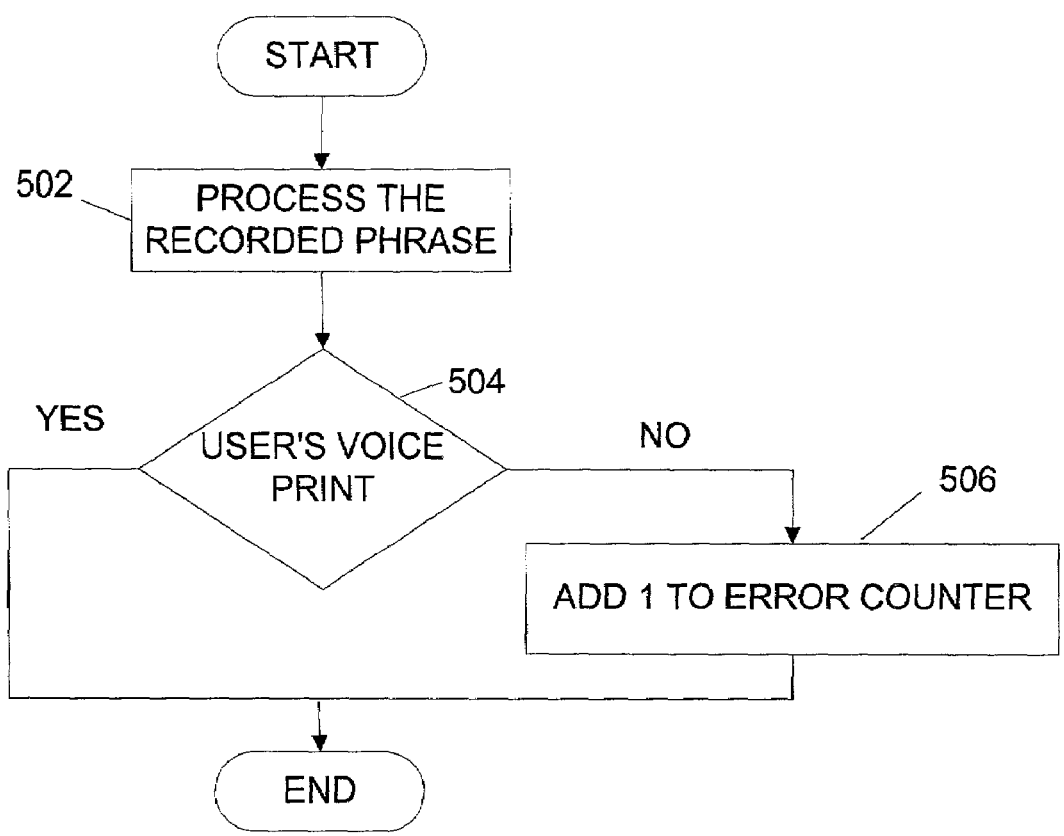
FIG. 5 is a flow diagram that illustrates the processing executed by the computers illustrated in FIG. 1 to perform the voice print verification processing.

As noted above, speaker recognition technology is used to compare the authorized user's voiceprint with a new user's recording during the course of the lesson and is one of the three ways in which an access authorization outcome is generated. The voiceprint comparison will take place in the background, without the studying user becoming aware of the process, and without interference to either the user or the lesson progress. FIG. 5 illustrates details of the process.

In the first voiceprint checking step, indicated by the FIG. 5 flow diagram box numbered 502, the system processes the recorded phrase. The processing is well known as can be understood from the Reference above that present one potential approach. The process as described in the reference above ("Nonlinear Discriminant Feature Extraction for Robust Text Independent Speaker Recognition") includes the following processing:

1. For each speech frame, extract 17 cepstral coefficients and an estimate of the pitch.
2. Input current frame features plus 4 past frames plus 4 future frames into 5-layer MLP, 162-dimension vector to produce 31 outputs.
3. Train a GMM for the target speaker.

The learning facility then compares the processed voiceprint information and the user voiceprint information stored in the learning facility database, as indicated by the decision box numbered 504. If the two pieces of information do not match, a negative outcome at the decision box 504, then at box 506 one error will be added to an error count. The error count is used by other learning facility processes, as will be described below. The comparison step completes the voice print checking process.

Tracing User Progress

Figure 6:
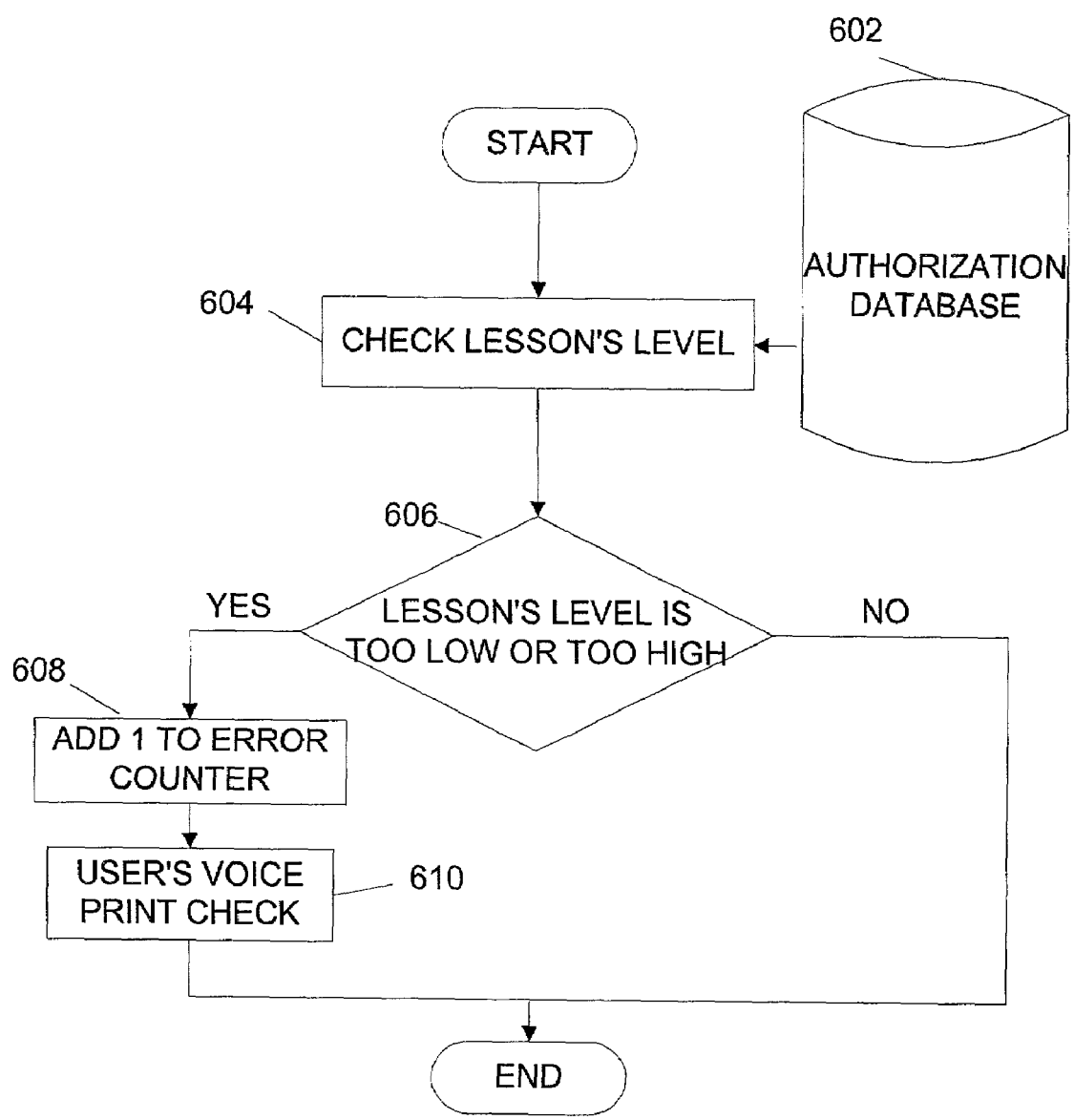
FIG. 6 is a flow diagram that illustrates the processing executed by the computers illustrated in FIG. 1 to perform the user trace processing.

Another way of checking user authorization and generating an access authorization outcome (FIG. 2) is to trace the authorized user's progress through the lesson plan. The system recognizes that any change in the level of the lesson, made by the studying user, might be an indication that a non-authorized user is using the product and accessing the learning facility. The user progress tracing by the system helps prevent such unauthorized use by initiating a re-checking of the user's voiceprint information during use. The user progress tracing is illustrated in FIG. 6. As with the voiceprint comparison process (FIG. 5), the user progress tracing will take place in the background, without the studying user becoming aware of the process, and without interference to either the user or the lesson progress.

In the first user progress tracing step, the system retrieves the identified user's previous lesson level in the lesson plan from the learning facility Authorization database, indicated at the FIG. 6 flow diagram box numbered 602, and compares that level against the lesson level presently being used by the identified user, as indicated at box 604. Some repetition and review, or preview, of lesson plans is to be expected, but a relatively large discrepancy in current lesson plan level as compared with the lesson level of the previous user session may indicate that a person other than the authorized user has gained access to the authorized user name and password. Therefore, at the decision box numbered 606, the system determines if the present lesson level is different from the previous lesson level by greater than a predetermined acceptable difference. The expected, or acceptable, difference will typically be a function of the total number of lessons in the lesson plan and the difficulty of the lesson plan. The acceptable difference should be provided by those involved in developing the learning plan of the system.

At the decision box 606, if the present lesson level is not outside the acceptable range of difference compared to the level of the previous communication session, a negative outcome at the decision box, then the user progress tracing check is completed. If the present lesson level is too low or too high, compared to the previous lesson level, then at box 608 the system adds one error to the user authorization error count. The error count then preferably initiates a user voiceprint check at box 610, a process that is described above in connection with FIG. 5. This completes the user progress tracing check.

User Performance Evaluation

Figure 7:
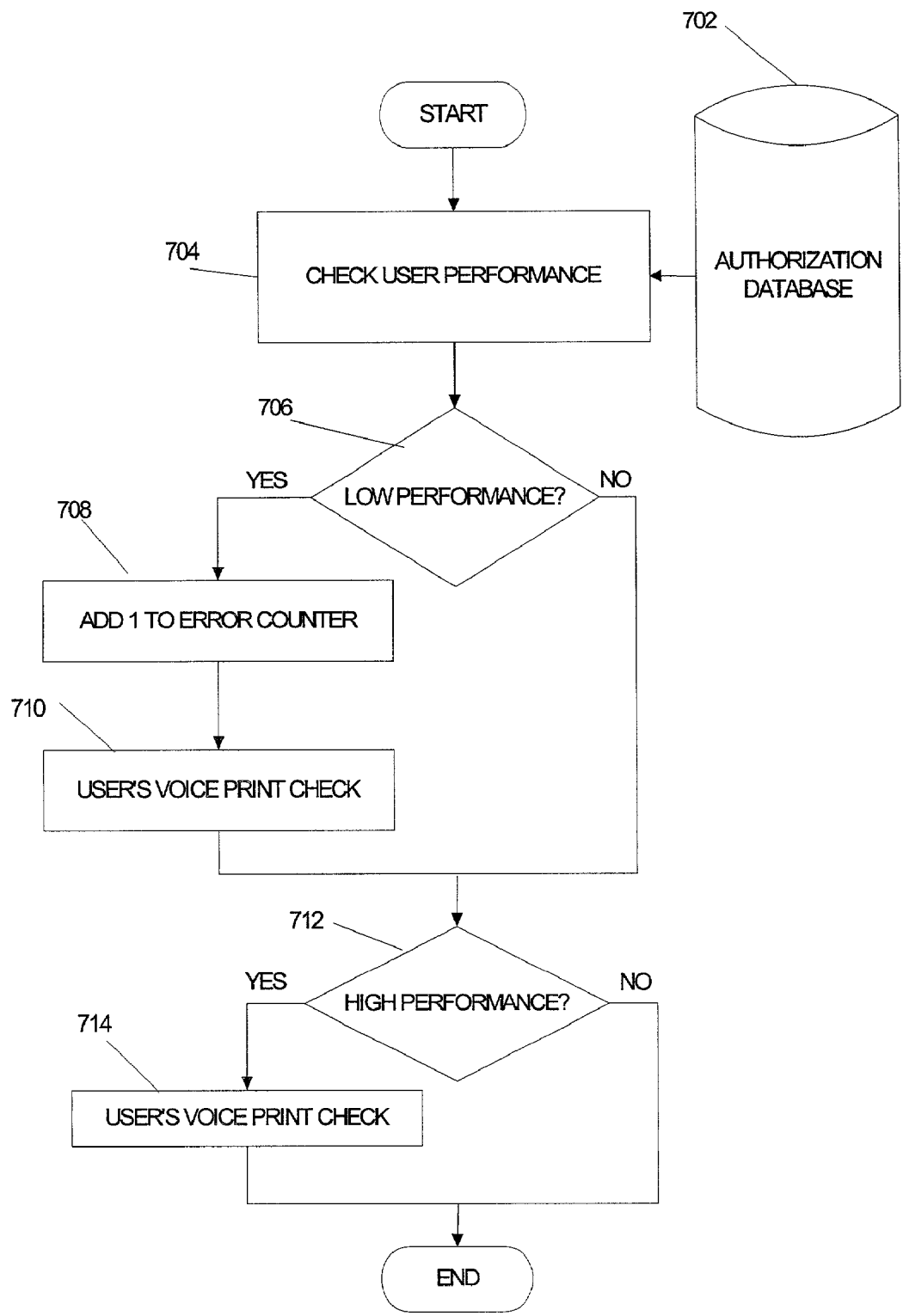
FIG. 7 is a flow diagram that illustrates the processing executed by the computers illustrated in FIG. 1 to perform the user performance evaluation processing.

Another way of checking user authorization and generating an access authorization outcome (FIG. 2) is to evaluate the studying user's performance in the lesson plans. The system recognizes that any dramatic (that is, significant) change to the studying user's performance compared to the authorized user might be an indication that a non-authorized user is using the product. The user performance evaluation by the system helps prevent such unauthorized use a case by initiating a re-checking of the user's voiceprint information during use. The user progress tracing is illustrated in FIG. 7. As with the voiceprint comparison process (FIG. 5), the user performance evaluation will take place in the background, without the studying user becoming aware of the process, and without interference to either the user or the lesson progress.

In the first user performance evaluation step, the system retrieves user performance data for the identified user from the Authorization database, as indicated by the flow diagram box numbered 702, and checks it against the present user's performance, as indicated by the flow diagram box numbered 704. The system will check for performance that is too low and too high. At the decision box numbered 706, the system checks for a low performance by the user. If the present studying user's performance is too low compared to the previous user's performance, an affirmative outcome at the decision box 706, then at box 708 one error will be added to the error count and at box 710 the user's voiceprint will be checked again.

After the error count adjustment, and following any system determination that the studying user's performance is not too low (a negative outcome at the decision box 706), the system processing checks for any performance is too high at the decision box numbered 712. If the present studying user's performance level seems too high compared to the previous user level, it might indicate possible use by a non-authorized user. It might also indicate that the same authorized user has improved his or her skills. Therefore, if the user's performance is too high, an affirmative outcome at the decision box 712, then the user's voiceprint will be checked again, as indicated by the flow diagram box numbered 714.

It should also be noted that user performance may comprise user proper pronunciation performance. For example, a Japanese (non-native American) user may have been trained to properly pronounce the American English letter "R" sound. Initially, the user's pronunciation may have been recognized as an American English "L" sound, and after intensive training it may sound like a proper American English "R" sound. Such a skill (the proper pronunciation of the American English "R") is an example of the user performance described above.

Authorization Decision

Figure 8:
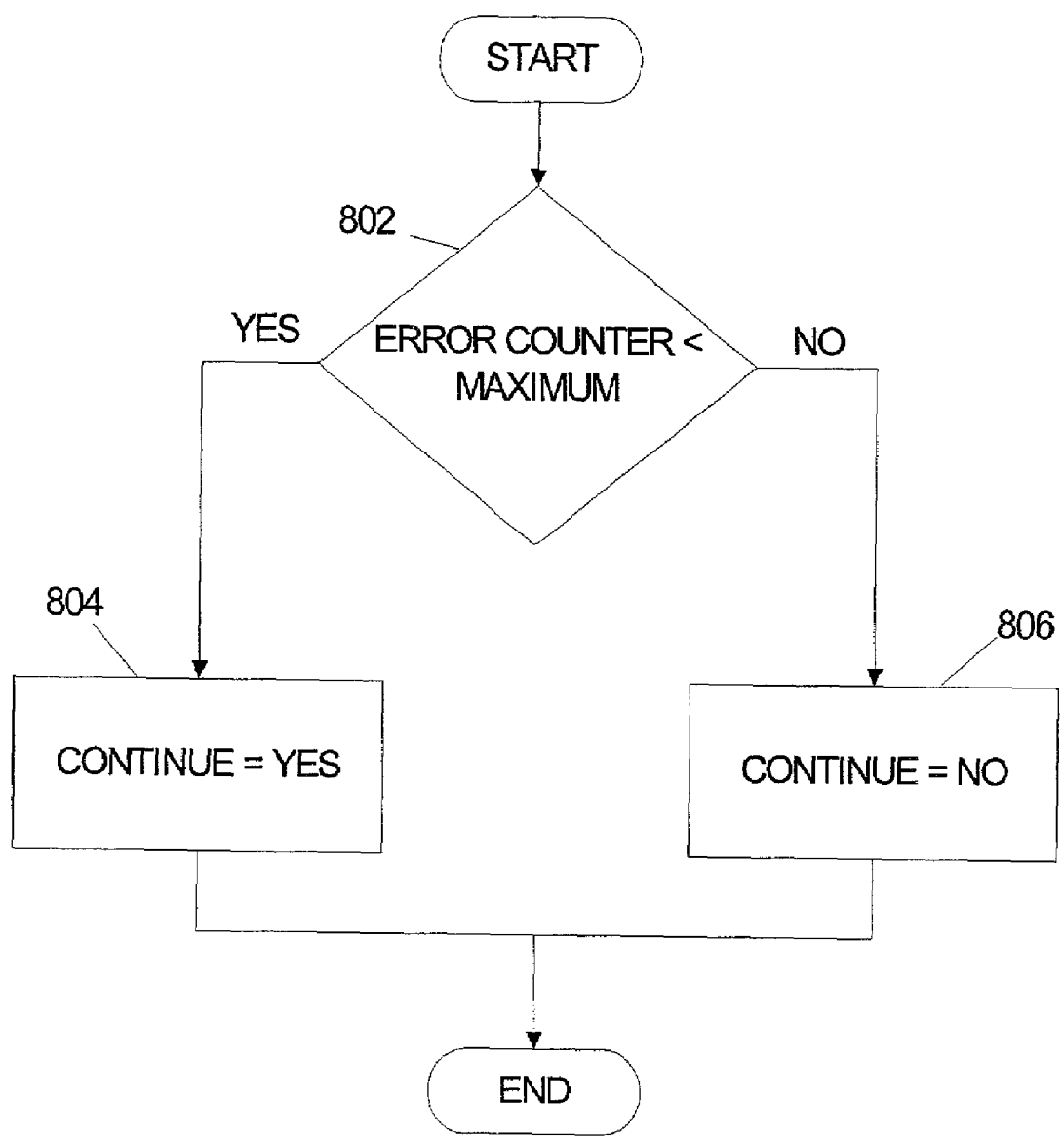
FIG. 8 is a flow diagram that illustrates the processing executed by the computers illustrated in FIG. 1 to perform the continued access decision processing.

After the system performs the random check of user authorization and receives an access authorization parameter (FIG. 2), the system will decide whether or not to continue the lesson, based on the access authorization parameter. In the system described above, the access authorization parameter comprises the error count maintained by the learning server. The access authorization parameter is illustrated in FIG. 8. The system checks the error count at the decision box numbered 802. If the error count indicates a number of failed voiceprint checks less than a predetermined limit number, an affirmative outcome at the decision box 802, then the system will decide that the present user is an authorized user and will let the lesson plan continue at box 804. For example, the maximum number of error counts may be three errors. If the error count is not less than the permitted maximum number, a negative outcome at the decision box 802, then the system will decide that the present user is not an authorized user and at box 806 will stop the lesson progress. In either case, the system may set a continue flag to a YES value or NO value, to thereby control the lesson progress. If the system cannot firmly decide that a particular user is unauthorized, despite a number of failed voice print checks, then the system will enable the user to continue the lesson. Thus, in such a case the continue flag will be updated with a YES value.

Computer Construction

As described above in connection with FIG. 1, the functionality of the Learning Server 110 and Speaker Recognition processor 112 may be distributed across multiple computers or may be implemented in a single computer. The computer(s) that implement the processing of the Computer Facility and the computer that implements the processing of the user's Personal Computer, or any other computer device of the system, may comprise a variety of processing devices, such as a handheld computing device, a Personal Digital Assistant (PDA), and any conventional computer suitable for implementing the functionality described herein.

Figure 9:
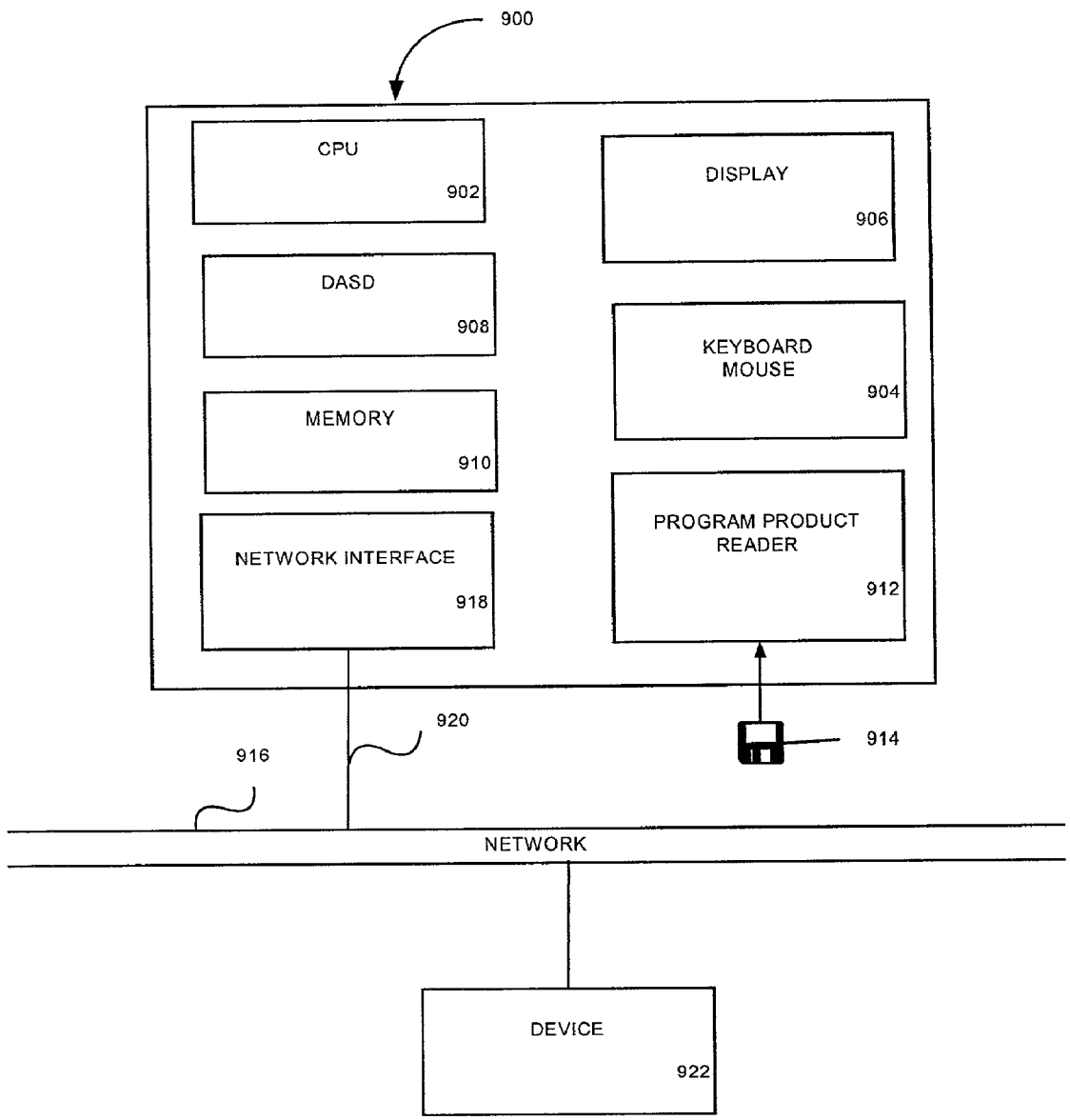
FIG. 9 is a block diagram of a computer of the system illustrated in FIG. 1, constructed in accordance with the present invention.

FIG. 9 is a block diagram of an exemplary computer device 900 such as might comprise the PC or the server computing devices shown in FIG. 1. Each computer 900 operates under control of a central processor unit (CPU) 902, such as an application specific integrated circuit (ASIC) from a number of vendors, or a "Pentium"-class microprocessor and associated integrated circuit chips, available from Intel Corporation of Santa Clara, Calif., USA. Commands and data can be input from a user control panel, remote control device, or a keyboard and mouse combination 904 and inputs and output can be viewed at a display 906. The display is typically a video monitor or flat panel display device. The user's PC (FIG. 1) is a voice-enabled device that can receive spoken input from the user, and therefore the user's PC will include a microphone and sound card interface as part of the input peripherals 904, in addition to the keyboard and mouse.

The computer device 900 may comprise a personal computer or, in the case of a client machine, the computer device may comprise a Web appliance or other suitable network communications, voice-enabled device. In the case of a personal computer, the device 900 preferably includes a direct access storage device (DASD) 908, such as a fixed hard disk drive (HDD). The memory 910 typically comprises volatile semiconductor random access memory (RAM). If the computer device 900 is a personal computer, it preferably includes a program product reader 912 that accepts a program product storage device 914, from which the program product reader can read data (and to which it can optionally write data). The program product reader can comprise, for example, a disk drive, and the program product storage device can comprise removable storage media such as a floppy disk, an optical CD-ROM disc, a CD-R disc, a CD-RW disc, a DVD disk, or the like. Semiconductor memory devices for data storage and corresponding readers may also be used. The computer device 900 can communicate with the other connected computers over a network 916 (such as the Internet) through a network interface 918 that enables communication over a connection 920 between the network and the computer device.

The CPU 902 operates under control of programming steps that are temporarily stored in the memory 910 of the computer 900. When the programming steps are executed, the pertinent system component performs its functions. Thus, the programming steps implement the functionality of the system illustrated in FIG. 1. The programming steps can be received from the DASD 908, through the program product 914, or through the network connection 920, or can be incorporated into an ASIC as part of the production process for the computer device. If the computer device includes a storage drive 912, then it can receive a program product, read programming steps recorded thereon, and transfer the programming steps into the memory 910 for execution by the CPU 902. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 910 over the network 916. In the network method, the computer receives data including program steps into the memory 910 through the network interface 918 after network communication has been established over the network connection 920 by well-known methods that will be understood by those skilled in the art without further explanation. The program steps are then executed by the CPU 902 to implement the processing of the system.

As noted above, the user's Personal Computer 900 may communicate with other computing devices 922, which may provide the functionality of the Computer Facility 108 (FIG. 1).

Additional Access Authorization with Code Generator

Figure 10:
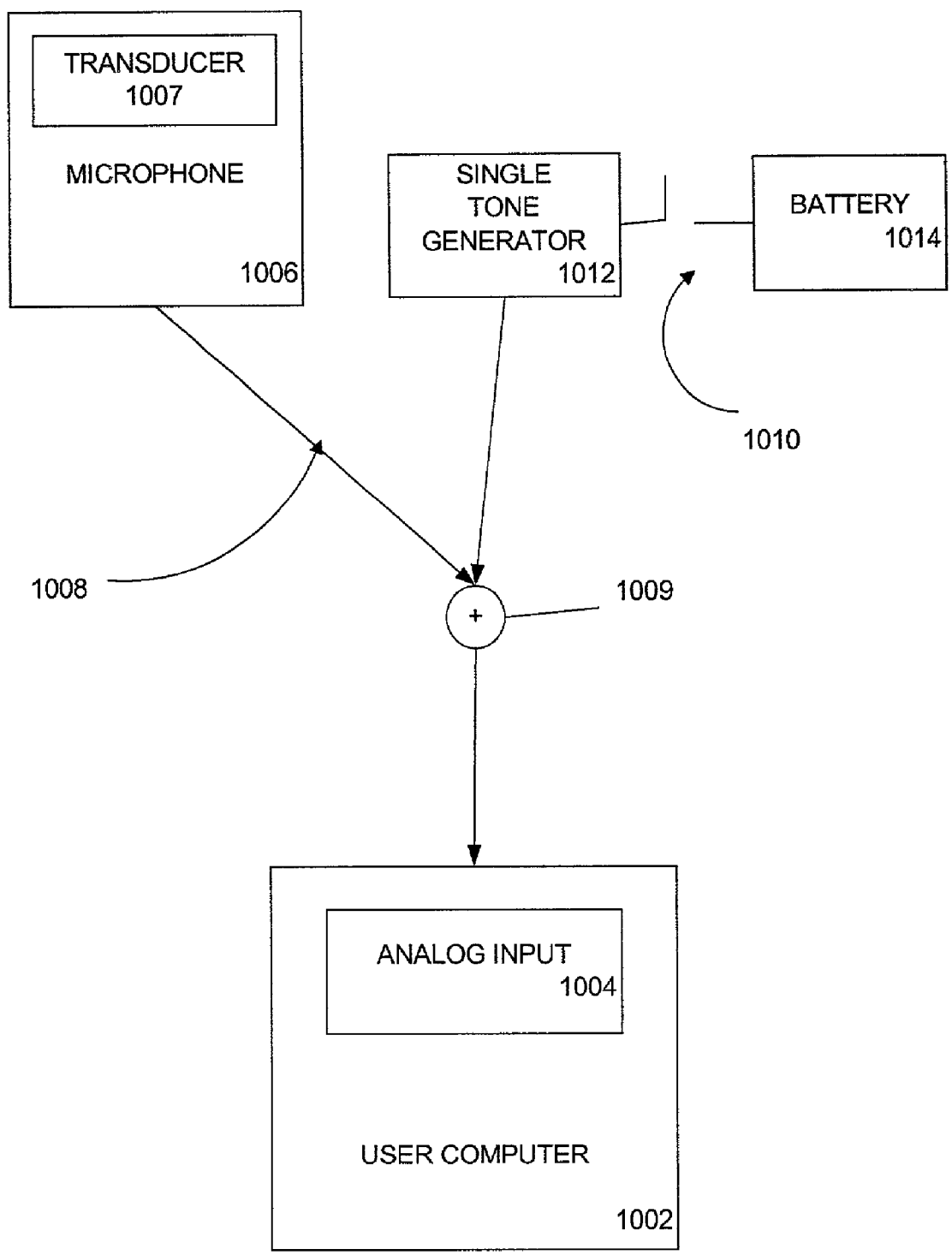
FIG. 10 is a schematic representation of a user computer with an attached user input device.

In addition to the analysis of user interaction input described above, a preferred embodiment of a language instruction system constructed in accordance with the present invention utilizes an input device that supplements the authorization operation and is marketed and sold in conjunction with the lesson modules obtained from the Computer Facility 108 (FIG. 1). FIG. 10 is a schematic representation of a user computer with such a user input device. In the preferred embodiment, the user cannot participate in the program of language instruction unless the user input device is connected to the user computer.

The user computer 1002 has a construction similar to that illustrated in FIG. 9 for a conventional Personal Computer (PC). The user PC 1002 includes an analog input port 1004 for a user input device such as a microphone apparatus 1006, which is shown attached to the PC. A connection line 1008 connects the microphone apparatus to the PC, providing a channel of communication between the microphone transducer 1007 (which produces an electrical signal corresponding to an audio stimulus) and the PC 1002. Other means of connecting the microphone to the PC may be used, such as infrared (IR) ports, radio frequency (wireless) connections, and Universal Serial Bus (USB) connections.

A switch 1010 is provided to trigger the operation of a code generator 1012 that produces a code output signal to the analog input port 1004. If the switch 1010 is not closed, then electrical power is not provided to the code generator, and the microphone transducer output is provided to the analog input port 1004. A battery 1014 provides a source of electrical energy to power the code generator 1012, which produces a predetermined sequence of tones that are provided to the analog input port 1004 of the PC 1002. The code generator may comprise a single tone generator wherein code symbols 0, 1, 2, . . . 9 are represented by a set of corresponding frequency tones such as 300 Hz, 400 Hz, 500 Hz, . . . , 1200 Hz, for example, or the code generator may comprise a modem transmitter, or other device that generates multiple tones. The PC 1002 can be provided with processing that recognizes the tones being received at the analog port 1004 and determines the proper code (equivalent code symbols) being generated. Such processing will be apparent to those skilled in the art.

The switch 1010 is preferably a switch that is activated by the user upon request by a message received at the PC 1002 and displayed for observation by the user at the PC display. By activating the switch 1010, the user causes the predetermined sequence of output tones to be generated by the code generator 1012. These tones are received by the PC 1002 and are analyzed and converted to a digital code by the user computer before they are communicated to the computer facility. If the transmitted code matches a known code or is otherwise validated, then the user is determined to be an authorized user. If the generated tones do not match a predetermined code known to the computer facility, then the user is not authorized. Access to the program of language instruction can then be halted. The microphone apparatus 1006 can be marketed and sold independently of the lesson modules, subject to the access control described above, or the microphone apparatus can be marketed and sold in conjunction with controlled access to the lesson modules, as described next.

Limited Access Selling

In the preferred embodiment of the system, an input device such as the microphone apparatus illustrated in FIG. 10 is sold to users as a unit that is associated with an access permit to the program of language instruction. When a user purchases the microphone apparatus, the user is guaranteed access to a predetermined number of data modules or components of the language instruction program. For example, the language instruction program may comprise twenty modules. Purchasing the microphone apparatus gives the user the right to select a number of the modules, for example, two modules. If the user wants to utilize more than the predetermined number, the user must pay an additional amount.

As an alternative to selling the generator-equipped microphone apparatus of FIG. 10, a conventional microphone may be sold, packaged with a printed code. After purchase, the user will be asked to enter the printed code via the user computer keyboard, and the entered code will be subject to a validation process. The user will again be granted limited access rights upon the initial entry of the code, so that a predetermined number of language instruction modules may be selected.

Figure 11:
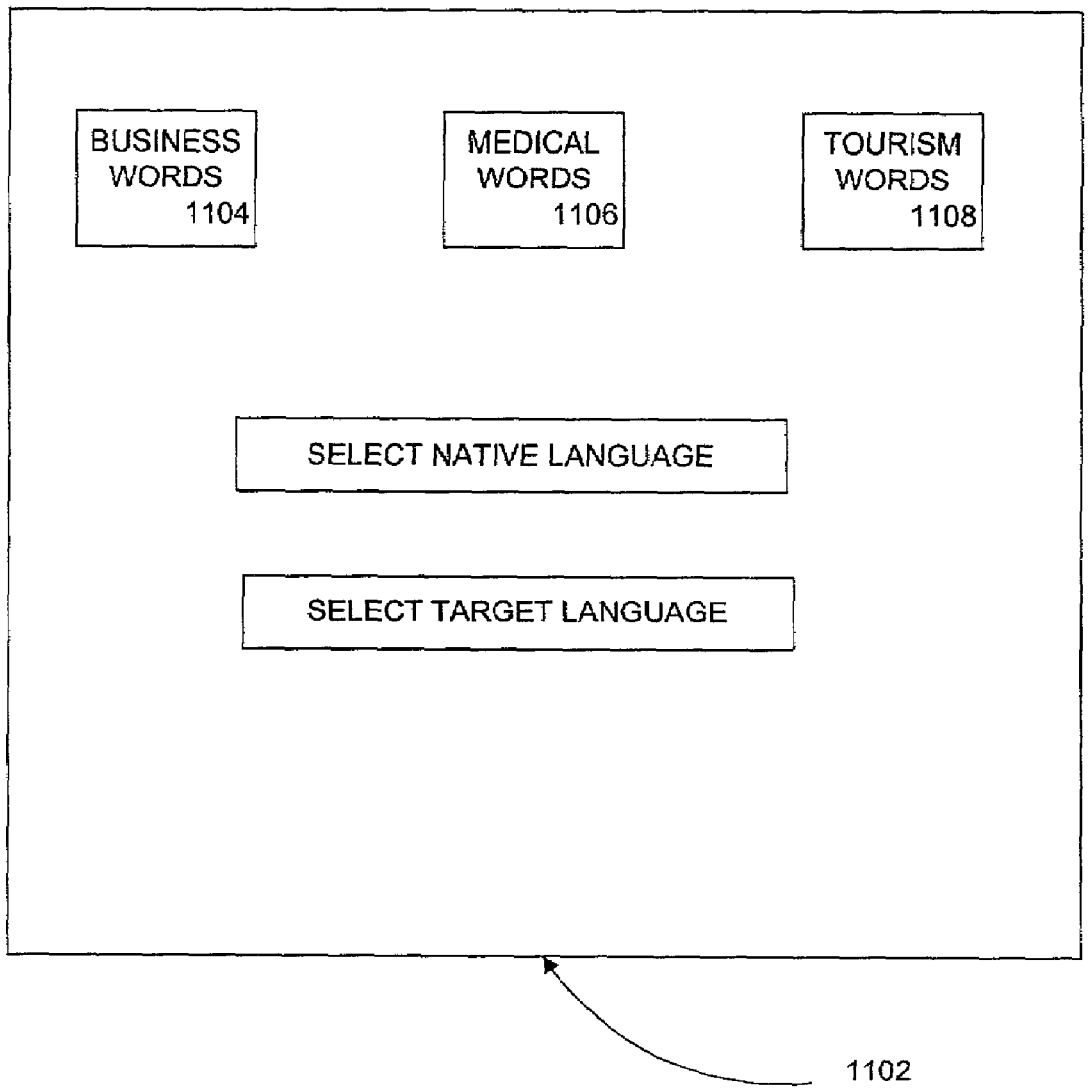
FIG. 11 is a representation of a sample Web page shown at a display of a user's computer, illustrating the user's selection of data modules.

In the preferred embodiment, the program of language instruction is available over a network such as the Internet. FIG. 11 shows a sample Web page 1102 that is shown at a display of a user's computer. The Web page shows that a user is presented with a menu of choices, such as selection of alternative vocabulary modules comprising instruction relating to business words 1104, medical words 1106, tourism 1108, and the like. A user may make a selection, for example, by using a display mouse cursor to "click" on a selection 1104, 1106, 1108. Thus, a user who purchases the microphone apparatus connects the microphone to the computer. The user then goes to the Web site of the language instruction provider. After a log-in and registration procedure, the user is presented with the Web page shown in FIG. 11 and makes a selection of choices, up to a predetermined limit set by the language instruction provider. The user can also select the user's native language and the target language for instruction.

Before granting access to the user for the initial user selection of modules, the Web site would instruct the user to activate the microphone apparatus switch as described above. The generated code would be sent from the microphone apparatus code generator to the user's remote computer over the communication channel and from the remote computer the information would be sent to the language instruction Web site. As described above, if the generated code is proper, the user is granted access to the selected modules.

Thereafter, if the user wants to utilize additional language instruction modules, the user must request the modules and must authorize payment. In the Web site embodiment, the user may view information about additional modules at the language provider Web site, may request access to additional modules, and may transmit a payment authorization, such as a credit card charge authorization. This information would be received and processed by the language instruction provider, who would grant access to the requested modules. As noted above, the modules may be provided in an interactive, on-line manner, or the modules may be received by network download to the user's computer. The user may be identified by the code that is generated by the microphone apparatus, so that the log-in procedure during a subsequent session will enable a user who has paid for an additional module to continue with the authorized module.

Thus, the present invention provides a technique to control access to network resources in which an identified user at a client node is verified as being entered into a network user password database prior to having access to the computer network facility. The system then permits the user to enjoy access and then waits a predetermined time after access to verify that voiceprint data of the identified user has been entered into a network voiceprint database or, if it has not been entered, receives voiceprint data from the identified user as a result of the user speaking a predetermined phrase. The system then determines whether to permit continued access to the computer network facility by the identified user in response to at least one access parameter authorization outcome. Any unauthorized user may advantageously be given an opportunity to become an authorized user by payment of a fee. In this way, access to the network facility is controlled, and unauthorized users are potentially converted into authorized users.

The present invention has been described above in terms of a presently preferred embodiment so that an understanding of the present invention can be conveyed. There are, however, many configurations for network access control systems not specifically described herein but with which the present invention is applicable. The present invention should therefore not be seen as limited to the particular embodiments described herein, but rather, it should be understood that the present invention has wide applicability with respect to network access control generally. All modifications, variations, or equivalent arrangements and implementations that are within the scope of the attached claims should therefore be considered within the scope of the invention.

We claim:

1. A method of controlling access to a language learning computer facility, the method comprising:
   permitting a user to interact with the computer facility through a user computer, the user interaction comprising language learning responses submitted to the computer facility through the user computer;
   performing a user authentication process to determine if the permitted user interaction is authorized; and
   determining whether the permitted user interaction should be continued, if the user is determined not to be authorized;
   wherein the user authentication process is performed with user authentication information that is obtained by the computer facility during the permitted user interaction and also with user authentication information extracted from the user's language learning responses;
   wherein the permitted user interaction includes receiving user speaker verification information that is obtained from the user in response to language learning requests from the computer facility and further including:
   analyzing the speaker verification information to verify that the user is a recognized speaker;
   wherein the determination of whether user interaction should be continued is performed a predetermined time after the user begins interaction with the computer facility; and
   wherein the predetermined time comprises a predetermined number of computer facility requests.

2. A method of controlling access to a language learning computer facility, the method comprising:
   permitting a user to interact with the computer facility through a computer node of a network, the user interaction comprising language learning responses submitted to the computer facility through the computer node;
   performing a user authentication process to determine if the permitted user interaction is authorized; and
   determining whether the permitted user interaction should be continued, if the user is determined not to be authorized;
   wherein the user authentication process is performed with user authentication information that is obtained by the computer facility during the permitted user interaction and also with user authentication information extracted from the user's language learning responses;
   wherein the permitted user interaction includes receiving user speaker verification information that is obtained from the user in response to language learning requests from the computer facility and further including:
   analyzing the speaker verification information to verify that the user is a recognized speaker; and
   wherein the system permits continued access in response to a match between the user speaker verification information and reference speaker verification information for the user in a database of the computer facility.

3. A method as defined in claim 2, wherein the user authentication process comprises verifying that speaker verification information of the user is sufficiently similar to reference speaker verification information from an identified user in the database so as to conclude that the user is the identified user.

4. A method as defined in claim 3, wherein the user speaker verification information is obtained from the user as a result of speaking a predetermined phrase at the computer node to thereby provide a text dependent verification.

5. A method of controlling access to a language learning computer facility, the method comprising:
   permitting a user to interact with the computer facility through a computer node of a network, the user interaction cornpri sing language learning responses submitted to the computer facility through the computer node;
   performing a user authentication process to determine if the permitted user interaction is authorized; and
   determining whether the permitted user interaction should be continued, if the user is determined not to be authorized;
   wherein the user authentication process is performed with user authentication information that is obtained by the computer facility during the permitted user interaction and also with user authentication information extracted from the users language learning responses;
   wherein the user authentication information comprises student instruction progress information obtained during the language learning user interaction;
   the method further including analyzing the student instruction progress information to verify that the user is a student who has made progress through an instruction plan of the computer facility and to determine if one or more user inputs that identify the user's progress through the instruction plan indicate that the user's progress is sufficiently different from the student's progress to conclude that the user is someone other than the student, and therefore is not authorized.

6. A method of controlling access to a language learning computer facility, the method comprising:
   permitting a user to interact with the computer facility through a computer node of a network, the user interaction comprising language learning responses submitted to the computer facility through the computer node;
   performing a user authentication process to determine if the permitted user interaction is authorized; and
   determining whether the permitted user interaction should be continued, if the user is determined not to be authorized;
   wherein the user authentication process is performed with user authentication information that is obtained by the computer facility during the permitted user interaction and also with user authentication information extracted from the user's language learning responses;
   wherein the user authentication information comprises student instruction performance information obtained from the user during the language learning user interaction;
   the method further including analyzing the student instruction performance information to determine if the user is identified as a student who has recorded performance data while making progress through an instruction plan of the computer facility, and to determine if one or more user inputs that identify the user's performance through the instruction plan indicate that the user's performance is sufficiently different from the student's performance to conclude that the user is someone other than the student, and therefore is not authorized.

7. A method of controlling access to a language learning computer facility, a method comprising:
   permitting a user to interact with the computer facility through a computer node of a network, the user interaction comprising language learning responses submitted to the computer facility through the computer node;

performing a user authentication process to determine if the permitted user interaction is authorized; and determining whether the permitted user interaction should be continued, if the user is determined not to be authorized;

wherein the user authentication process is performed with user authentication information that is obtained by the computer facility during the permitted user interaction and also with user authentication information extracted from the user's language learning responses;

wherein the user authentication information comprises student instruction performance information obtained from the user during the language learning user interaction;

wherein the computer facility provides spoken language learning instruction during the user interaction and the performance information comprises user speech input information obtained from the user during the user interaction with the computer facility.

8. A method of controlling access to a language learning computer facility, the method comprising:

permitting a user to interact with the computer facility through a computer node of a network, the user interaction comprising language learning responses submitted to the computer facility through the computer node;

performing a user authentication process to determine if the permitted user interaction is authorized; and determining whether the permitted user interaction should be continued, if the user is determined not to be authorized;

wherein the user authentication process is performed with user authentication information that is obtained by the computer facility during the permitted user interaction and also with user authentication information extracted from the user's language learning responses;

wherein performing the user authentication process comprises receiving multiple types of authentication information and determining user authorization based on criteria relating to information that includes at least two from among: user speaker verification information, user progress information, user performance information, or a user identification code;

wherein the received authentication information is analyzed and compared to corresponding information from a student who has previously provided voiceprint information, and made progress through an instruction plan of the computer facility, thereby generating performance data collected by the system while the student was making progress through an instruction plan of the computer facility; wherein the user is determined to be authorized if more than one of the user inputs comprising user voiceprint information, user progress, and user performance are sufficiently similar to the student's previously provided user inputs to conclude that the user is the student.

9. A method of controlling access to a language learning computer facility, the method comprising:

permitting a user to interact with the computer facility through a computer node of a network, the user interaction comprising language learning responses submitted to the computer facility through the computer node;

performing a user authentication process to determine if the permitted user interaction is authorized; and determining whether the permitted user interaction should be continued, if the user is determined not to be authorized;

wherein the user authentication process is performed with user authentication information that is obtained by the computer facility during the permitted user interaction and also with user authentication information extracted from the user's language learning responses;

wherein the user computer node comprises a client of the computer facility, the user responses to language learning requests from the computer facility comprise user speech input, and the user speaker verification information received by the computer facility comprises parametric data processed at the user computer node from the speech input.

10. A computer apparatus at a server node of a network, controlling access to a computer facility of the network, the computer apparatus comprising:

a network communication interface that permits communication with a user at a client node of the network; and a Speaker Recognition processor that permits the user to interact with the computer facility through a computer node of the network, wherein the user interaction comprises language learning responses submitted to the computer facility through the computer node, further that the Speaker Recognition processor performs a user authentication process to determine if the permitted user interaction is authorized and determines whether the permitted user interaction should be continued, if the user is determined not to be authorized; and wherein the user authentication process is performed with user authentication information that is obtained by the computer facility during the permitted user interaction and also with user authentication information that is extracted from the user's language learning responses;

wherein the Speaker Recognition processor receives speaker verification information from the user in response to language learning requests and analyzes the speaker verification information to verify that the user is a recognized speaker;

wherein the Speaker Recognition processor performs the determination of whether user interaction should be continued at a predetermined time after the user begins interaction with the computer facility; and wherein the predetermined time comprises a predetermined number of computer facility requests.

11. A computer apparatus at a server node of a network, controlling access to a computer facility of the network, the computer apparatus comprising:

a network communication interface that permits communication with a user at a client node of the network; and a Speaker Recognition processor that permits the user to interact with the computer facility through a computer node of the network, wherein the user interaction comprises language learning responses submitted to the computer facility through the computer node, further that the Speaker Recognition processor performs a user authentication process to determine if the permitted user interaction is authorized and determines whether the permitted user interaction should be continued, if the user is determined not to be authorized; and wherein the user authentication process is performed with user authentication information that is obtained by the computer facility during the permitted user interaction and also with user authentication information that is extracted from the user's language learning responses;

wherein the Speaker Recognition processor receives speaker verification information from the user in response to language learning requests and analyzes the speaker verification information to verify that the user is a recognized speaker;

wherein the system permits continued access in response to a match between the user speaker verification information and reference speaker verification information for the user in a database of the computer facility.

12. A computer apparatus as defined in claim 11, wherein the user authentication process comprises verifying that speaker verification information of the user is sufficiently similar to reference speaker verification information from an identified user in the database so as to conclude that the user is the identified user.

13. A computer apparatus as defined in claim 12, wherein the user speaker verification information is obtained from the user as a result of speaking a predetermined phrase at the computer node to thereby provide a text dependent verification.

14. A computer apparatus at a server node of a network, controlling access to a computer facility of the network, the computer apparatus comprising:

a network communication interface that permits communication with a user at a client node of the network; and a Speaker Recognition processor that permits the user to interact with the computer facility through a computer node of the network, wherein the user interaction comprises language learning responses submitted to the computer facility through the computer node, further that the Speaker Recognition processor performs a user authentication process to determine if the permitted user interaction is authorized and determines whether the permitted user interaction should be continued, if the user is determined not to be authorized; and wherein the user authentication process is performed with user authentication information that is obtained by the computer facility during the permitted user interaction and also with user authentication information that is extracted from the user's language learning responses;

wherein the user authentication information comprises student instruction progress information obtained during the language learning user interaction;

wherein the Speaker Recognition processor analyzes the student instruction progress information to verify that the user is a student who has made progress through an instruction plan of the computer facility and to determine if one or more user inputs that identify the user's progress through the instruction plan indicate that the user's progress is sufficiently different from the studenfs progress to conclude that the user is someone other than the student, and therefore is not authorized.

15. A computer apparatus at a server node of a network, controlling access to a computer facility of the network, the computer apparatus comprising:

a network communication interface that permits communication with a user at a client node of the network; and a Speaker Recognition processor that permits the user to interact with the computer facility through a computer node of the network, wherein the user interaction comprises language learning responses submitted to the computer facility through the computer node, fiuther that the Speaker Recognition processor performs a user authentication process to determine if the permitted user interaction is authorized and determines whether the permitted user interaction should be continued, if the user is determined not to be authorized; and wherein the user authentication process is performed with user authentication information that is obtained by the computer facility during the permitted user interaction and also with user authentication information that is extracted from the user's language learning responses;

wherein the user authentication information comprises student instruction performance information obtained from the user during the language learning user interaction;

wherein the Speaker Recognition processor analyzes the student instruction performance information to determine if the user is identified as a student who has recorded performance data while making progress through an instruction plan of the computer facility, and to determine if one or more user inputs that identify the user's performance though the instruction plan indicate that the user's performance is sufficiently different from the student's performance to conclude that the user is someone other than the student, and therefore is not authorized.

16. A computer apparatus at a server node of a network, controlling access to a computer facility of the network, the computer apparatus comprising:

a network communication interface that permits communication with a user at a client node of the network; and a Speaker Recognition processor that permits the user to interact with the computer facility through a computer node of the network, wherein the user interaction comprises language learning responses submitted to the computer facility through the computer node, further that the Speaker Recognition processor performs a user authentication process to determine if the permitted user interaction is authorized and determines whether the permitted user interaction should be continued, if the user is determined not to be authorized; and wherein the user authentication process is performed with user authentication information that is obtained by the computer facility during the permitted user interaction and also with user authentication information that is extracted from the user's language learning responses;

wherein the user authentication information comprises student instruction performance information obtained from the user during the language learning user interaction;

wherein the computer facility provides spoken language learning instruction during the user interaction and the performance information comprises user speech input information obtained from the user during the user interaction with the computer facility.

17. A computer apparatus at a server node of a network, controlling access to a computer facility of the network, the computer apparatus comprising:

a network communication interface that permits communication with a user at a client node of the network; and a Speaker Recognition processor that permits the user to interact with the computer facility through a computer node of the network, wherein the user interaction comprises language learning responses submitted to the computer facility through the computer node, further that the Speaker Recognition processor performs a user authentication process to determine if the permitted user interaction is authorized and determines whether the permitted user interaction should be continued, if the user is determined not to be authorized; and wherein the user authentication process is performed with user authentication information that is obtained by the computer facility during the permitted user interaction and also with user authentication information that is extracted from the user's language learning responses;

wherein the Speaker Recognition processor performs the user authentication process by receiving multiple types of authentication information and determining user authorization based on criteria relating to information that includes at least two from among: user speaker verification information, user progress information, user performance information, or a user identification code;

wherein the received authentication information is analyzed and compared to corresponding information from a student who has previously provided voiceprint information, and made progress through an instruction plan of the computer facility, thereby generating performance data collected by the system while the student was making progress through an instruction plan of the computer facility; wherein the user is determined to be authorized if more than one of the user inputs comprising user voiceprint information, user progress, and user performance are sufficiently similar to the student's previously provided user inputs to conclude that the user is the student.

18. A computer apparatus at a server node of a network, controlling access to a computer facility of the network, the computer apparatus comprising:

a network communication interface that permits communication with a user at a client node of the network; and a Speaker Recognition processor that permits the user to interact with the computer facility through a computer node of the network, wherein the user interaction comprises language learning responses submitted to the computer facility through the computer node, further that the Speaker Recognition processor performs a user authentication process to determine if the permitted user interaction is authorized and determines whether the permitted user interaction should be continued, if the user is determined not to be authorized; and wherein the user authentication process is performed with user authentication information that is obtained by the computer facility during the permitted user interaction and also with user authentication information that is extracted from the user's language learning responses;

wherein the Speaker Recognition processor receives speaker verification information from the user in response to language learning requests and analyzes the speaker verification information to verify that the user is a recognized speaker;

wherein the user computer node comprises a client of the computer facility, the user responses to language learning requests from the computer facility comprise user speech input, and the user speaker verification information received by the computer facility comprises parametric data processed at the user computer node from the speech input.

* * * * *